No. 835,939. PATENTED NOV. 13, 1906.
J. COOPER.
TIRE FOR WHEELS.
APPLICATION FILED SEPT. 11, 1905.

Witnesses.
K. F. Leary
K. Fanning

Inventor:
John Cooper
By his attorney
Baldwin Wight.

No. 835,939. PATENTED NOV. 13, 1906.
J. COOPER.
TIRE FOR WHEELS.
APPLICATION FILED SEPT. 11, 1905.
4 SHEETS—SHEET 2.
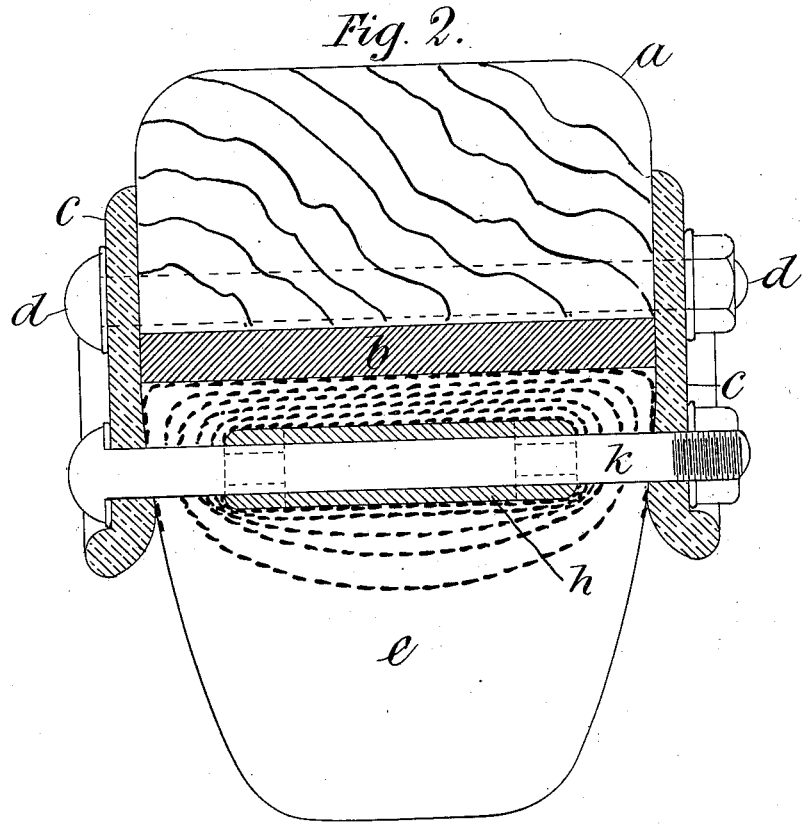

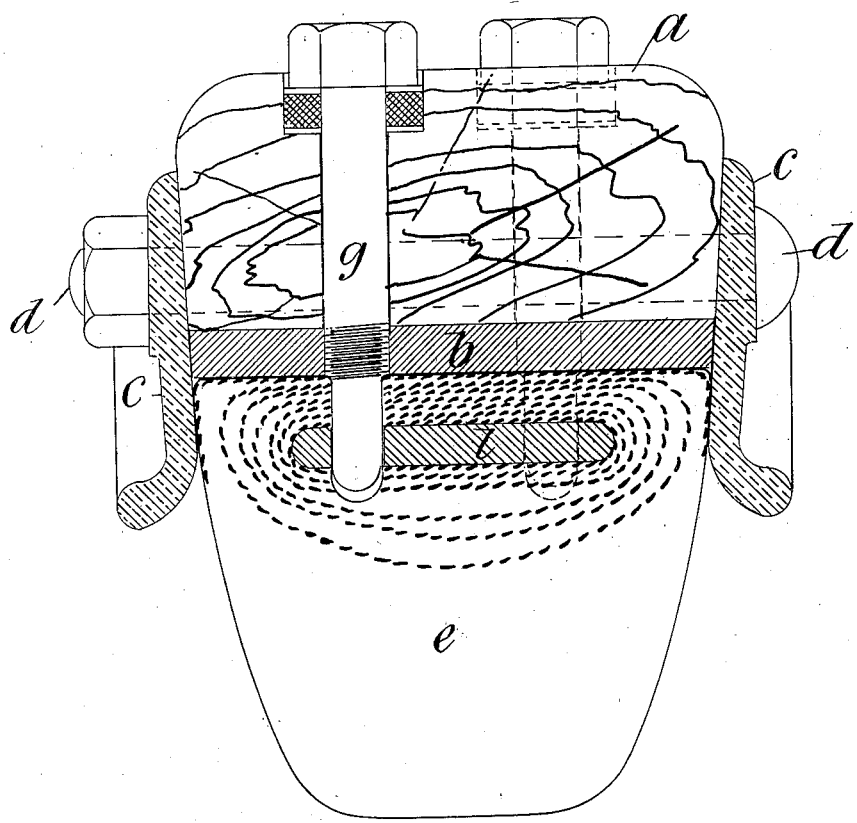

No. 835,939. PATENTED NOV. 13, 1906.
J. COOPER.
TIRE FOR WHEELS.
APPLICATION FILED SEPT. 11, 1905.

Witnesses.

Inventor.
John Cooper
By his Attorneys
Baldwin Wight.

UNITED STATES PATENT OFFICE.

JOHN COOPER, OF CAMBERWELL, ENGLAND.

TIRE FOR WHEELS.

No. 835,939. Specification of Letters Patent. Patented Nov. 13, 1906.

Application filed September 11, 1905. Serial No. 277,977.

*To all whom it may concern:*

Be it known that I, JOHN COOPER, managing director of The Dermatine Company, Limited, a subject of the King of Great Britain, residing at 95 Neate street, Camberwell, in the county of Surrey, England, have invented certain new and useful Improvements in Tires for Wheels, of which the following is a specification.

According to this invention solid tires are built up of layers of canvas cemented together by dermatin, india-rubber, or the like, and have embedded within them bands of metal which are bolted or otherwise fastened to the rim of the wheel, thus securing the tires.

Figure 1 is a transverse section of a wheel constructed according to this invention. Fig. 2 is a similar view of a modification. Figs. 3 and 4 are part sections of the tubes $h$ and bands $j$, Fig. 2. Figs. 5 and 6 are transverse sections showing other modifications; and Fig. 7 is a part section of the bands $m$ and trunnions $n$, Fig. 6.

In the arrangement shown in Fig. 1 a circular band, preferably formed of a flattened tube, is embedded in the tire and has in it screw-threaded holes to receive the ends of bolts passed radially outward through the rim of the wheel.

$a$ is the rim of the wheel, which is of wood, and $b$ is a metal hoop or tire around it.

$c$ represents annular side plates secured on the rim $a$ by through-bolts $d$ and having between them the elastic tire $e$.

$f$ is a band in the form of a flattened metal tube embedded in the elastic tire, and $g$ represents bolts passing radially through the rim $a$ and screwing into the tube $f$.

In the arrangement shown in Figs. 2 to 4 the tire has embedded in it a number of transverse tubes connected together by a circular band or bands, such tubes extending either partly or completely across the tire. Fixed on each side of the rim of the wheel are annular plates which are connected together by bolts passing through the tubes. The parts $a$, $b$, $c$, $d$, and $e$ are similar to those above described, but the circumferential tube $f$, Fig. 1, is replaced by a series of transverse tubes $h$, connected together by circumferential bands $j$, as shown in Figs. 3 and 4. The bolts $g$ also are replaced by bolts $k$, passing through the tubes. It is not necessary that the tubes $h$ and bolts $k$ should extend right across the tire, but the bolts may be short, extending only a little way into the tire and engaging holes in the band or bands.

Fig. 5 shows another modification of the arrangement illustrated in Fig. 1, the tube $f$ being replaced by a band $l$, also preferably endless, while the bolts $g$ are screwed to the rim and engage holes in the band instead of being screwed to it.

Figure 1:
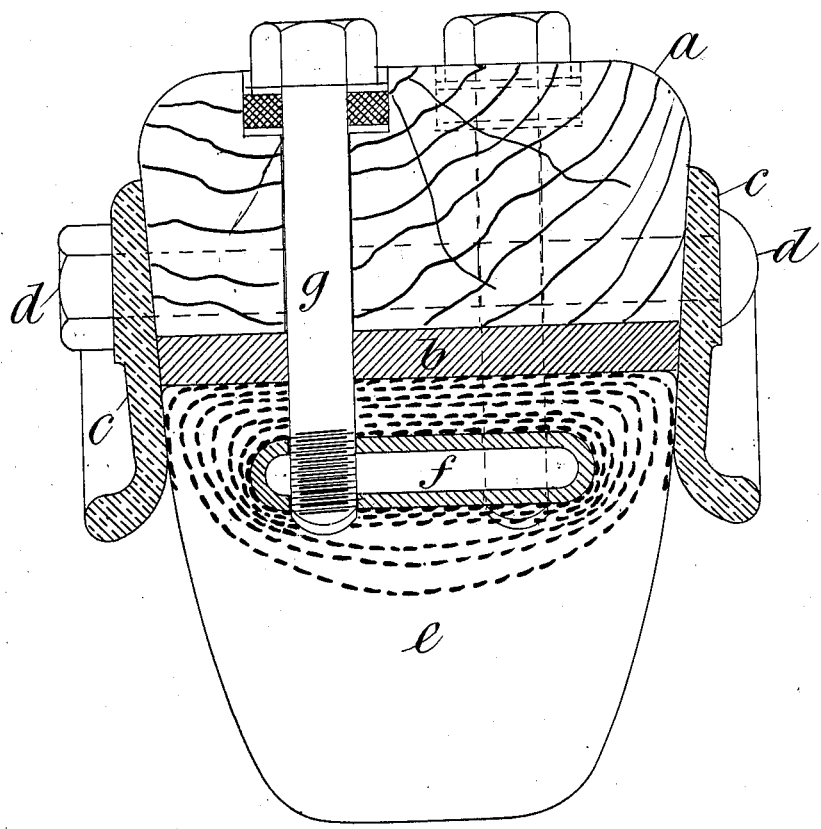
Figure 6:
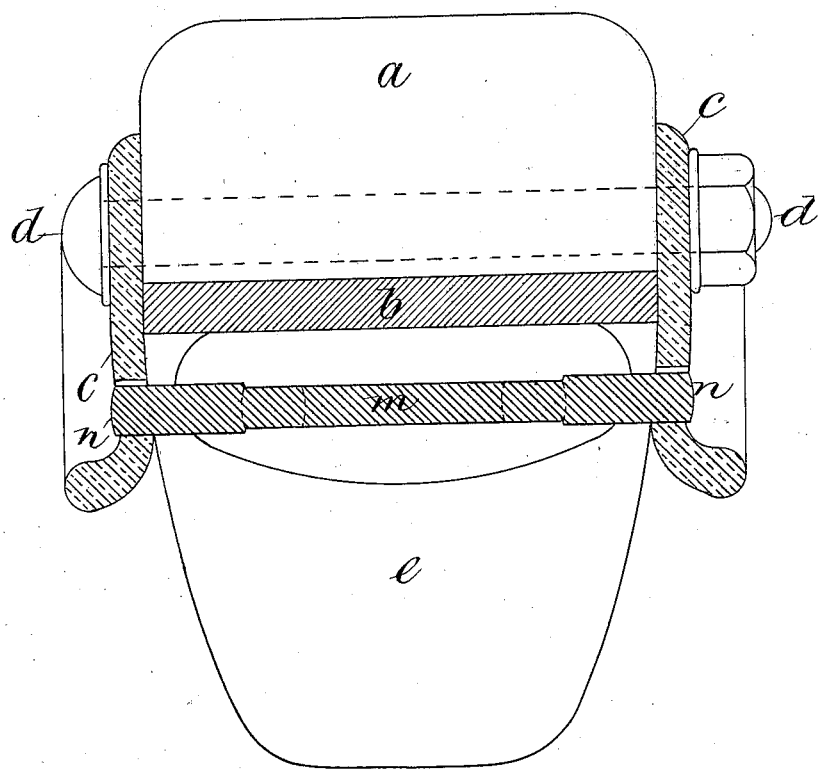
Fig. 6 shows a modification in which the band or bands $m$ are secured to the side plates $c$ by what may be called "trunnions" $n$, engaging holes in these plates.
Figure 7:
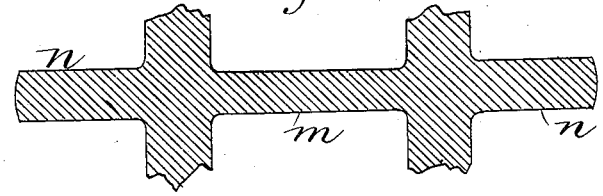
Fig. 7 is a section of part of these bands with the trunnions.

In all cases it is essential that the band should be so secured to the rim that it cannot creep around it, even should the bolts become loose.

What I claim is—

1. The combination of a rim, a solid tire on the rim, such tire consisting of an endless metallic band having layers of canvas wrapped around it, the band and canvas being embedded in and cemented together by elastic material, and bolts passing through the rim and entering holes in the band.

2. The combination of a rim, a solid tire on the rim, such tire consisting of an endless metallic band having layers of canvas wrapped around it, the band and canvas being embedded in and cemented together by elastic material, and bolts fixed to the rim and loosely engaging with holes in the band.

JOHN COOPER.

Witnesses:
C. R. C. HART,
J. Z. COOPER.